(12) United States Patent
Braun et al.

(10) Patent No.: US 6,300,817 B1
(45) Date of Patent: *Oct. 9, 2001

(54) TEMPERATURE STABILIZATION OF A PREDISTORTER

(75) Inventors: Klaus Braun, Stuttgart; Werner Berger, Ditzingen, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/353,056

(22) Filed: Jul. 13, 1999

(30) Foreign Application Priority Data

Jul. 15, 1998 (DE) ............................. 198 31 717

(51) Int. Cl.[7] ...................................... G05F 1/10
(52) U.S. Cl. .......................................... 327/513; 327/306
(58) Field of Search .................... 327/306, 512, 327/513; 359/132, 157, 180, 194

(56) References Cited

U.S. PATENT DOCUMENTS

| | | | |
|---|---|---|---|
| 5,161,044 | 11/1992 | Nazarathy et al. | 359/157 |
| 5,210,633 | 5/1993 | Trisno | 359/194 |
| 5,302,922 | * 4/1994 | Heidemann et al. | 333/18 |
| 5,327,279 | * 7/1994 | Farina et al. | 359/180 |
| 5,378,937 | * 1/1995 | Heidemann et al. | 327/306 |

FOREIGN PATENT DOCUMENTS

| | | |
|---|---|---|
| WO 94/02998 | 2/1994 | (WO) . |
| WO 97/35390 | 9/1997 | (WO) . |

* cited by examiner

*Primary Examiner*—Jung Ho Kim
(74) *Attorney, Agent, or Firm*—Sughrue, Mion, Zinn, Macpeak & Seas, PLLC

(57) ABSTRACT

A circuit to reduce the temperature-dependence of a predistorter diode in a predistorter for an external optical modulator characterized in that a predistorter diode (D1, D2) is connected in series with an ohmic resistance (Rv) and the series circuit is fed from a power supply in operation, whereby the voltage V1 of the power supply and the ohmic resistance are selected such that when the temperature of the predistorter changes the curvature of the temperature-dependent current-voltage curve for the predistorter diode hardly varies at the respective operating point. One advantage of the invention is the very simply type of compensation that it allows.

12 Claims, 2 Drawing Sheets

TEMPERATURE STABILIZATION OF A PREDISTORTER

BACKGROUND OF THE INVENTION

The invention relates to a circuit to reduce the temperature-dependence of a predistorter diode in a predistorter for an external optical modulator. Either current or voltage impression can be used to adjust the operating point of a diode in a signal-influencing network.

U.S. Pat. No. 5,210,633, FIG. 2 shows an arrangement with current impression. In this type of arrangement the dc voltage at the diode changes as a function of the level fluctuations of the signal let through by the diode, which can be a high-frequency signal. With this familiar arrangement, the operating point for a signal amplitude value of the high-frequency signal can be optimally adjusted if the diode network is a predistorter to linearize the output signal of an optical modulator. Thus, the current source has to be tracked according to the amplitude of the input signal for an optimal linearization of the curve in this familiar arrangement.

U.S. Pat. No. 5,161,044, FIG. 15 shows a diode network to linearize the output signal of an external optical modulator, which is linearized by a light from a light source. The diodes here are connected to voltage sources. Since these are semiconductor diodes, the current-voltage curve is temperature-dependent. The operating point of the diode thus changes with no particular measure when the temperature changes. It is already known that the voltage of predistorter diodes can be tracked using a computer according to a temperature table, whereby a temperature sensor and an A/D converter as well as D/A converter are required. However, this entails a lot of work and equipment.

It is also state-of-the-art to solve the problem by keeping the predistorter diodes at a constant temperature, for example using Peltier cooling.

SUMMARY OF THE INVENTION

The invention is based on reducing the influence of the temperature-dependence of the operating point of a predistorter diode.

This problem is solved in accordance with the invention by connecting the predistorter diode in series with an ohmic resistance and feeding the series circuit from a power supply during operation, whereby the voltage of the power supply and the ohmic resistance are selected such that when the temperature of the predistorter changes the curvature of the temperature-dependent current-voltage curve for the predistorter diode hardly varies, if at all, at the respective operating point.

One advantage of the invention is the very simple type of compensation which the invention enables. The simplest solution is to connect a resistance before the predistorter diode, whereby the series circuit of the resistance and predistorter diode has a constant voltage. The resistance should be dimensioned (e.g. through tests) to achieve the desired temperature compensation. It is important that the curvature of the curve in the respective operating point is essentially the same. This curvature is important for the generation of harmonics and thus for the distorting properties of the predistorter diode. It may be advantageous to keep the slope of the curve as constant as possible in every operating point.

A further advantage is that even if the operating point of the predistorter diode has been stabilised against temperature-dependence by another method, the measure in accordance with the invention still reduces or fully compensates the remaining changes in the curvature of the curve of the predistorter diode in the respective operating point during temperature fluctuations.

In one embodiment of the invention the voltage at a reference diode which is thermally coupled to the predistorter diode is impressed on the predistorter diode as a power supply. This means that one reference diode is adequate for two branches of a signal path.

Since the predistorter diodes under consideration are semiconductor diodes and the diode current rises with a rising temperature at a constant voltage, the invention can be used with no problems.

BRIEF DESCRIPTION OF THE DRAWINGS

Further features and advantages of the invention are explained in the following description of embodiments of the invention on the basis of drawings showing the most important details of the invention and in the claims. The individual features can be realised individually or in random combinations in an embodiment of the invention. The drawings show:

DETAILED DESCRIPTION OF THE INVENTION

Figure 1:
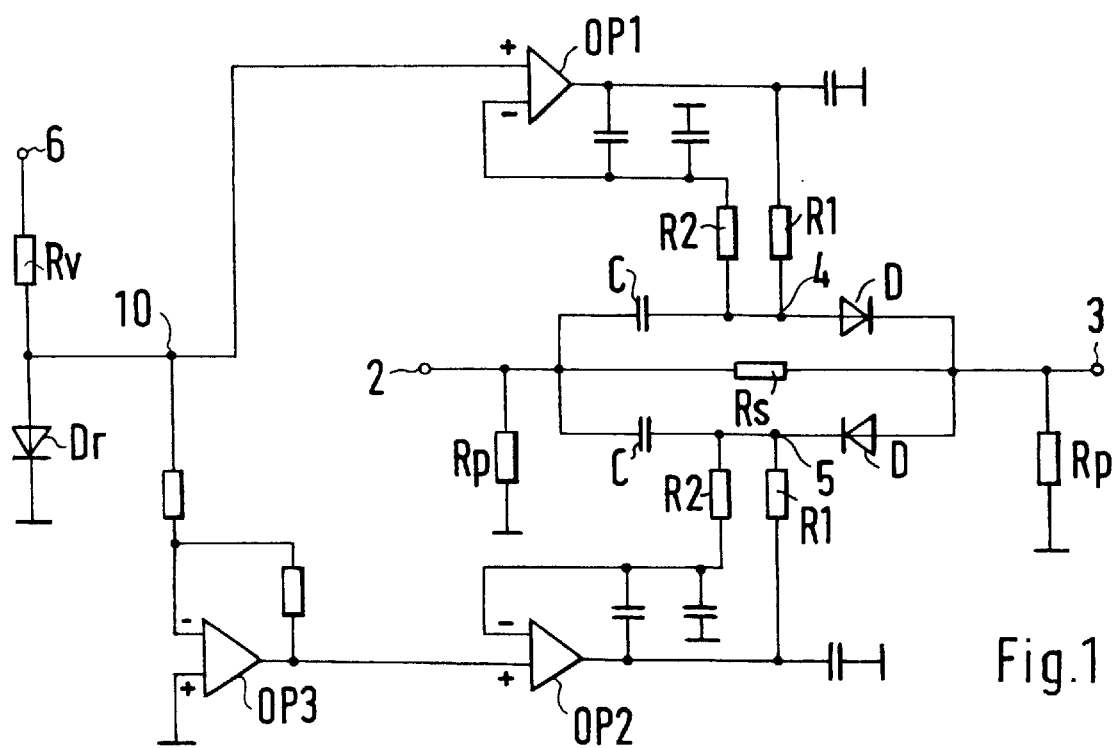
FIG. 1 a first embodiment of a predistorter circuit in accordance with the invention, FIG. 2 a second embodiment of a predistorter circuit in accordance with the invention, FIG. 3 current-voltage curve of a predistorter diode at various temperatures, FIG. 4 a block diagram of the arrangement with an optical modulator and a diode network in accordance with the invention as a predistorter circuit.

In FIG. 1 the signal path of a predistorter circuit 1 is between a connection 2 (input) and a connection 3 (output). The meanings of these connections 2 and 3 could also be exchanged. Connection 2 on the one hand and connection 3 on the other are each connected to earth via an ohmic resistance Rp and connections 2 and 3 are connected to each other by a resistance Rs. High-frequency components of the signal flow from connection 2 to connection 3, and also via two parallel branches, each formed by a series circuit consisting of a capacitor C and a diode D (semiconductor diode), whereby the diodes in both branches have opposite polarities and the capacitors C are directly connected to each other. The diodes D are predistorter diodes.

An operational amplifier OP1 has an output which is connected via a resistance R1 to the connecting point 4 between the capacitor C and the anode of the diode D of the upper branch connected to this. The connecting point 4 is also connected to the inverted input of the operational amplifier OP1 via a resistance R2. The non-inverted input of the operational amplifier OP1 is connected to the anode of a reference diode Dr, whose cathode is earthed. The anode of the reference diode is connected to a connection 6, which receives a constant voltage V1 during operation, via an ohmic resistance Rv. Some leads leading to the operational amplifier OP1 are still connected to earth and each other via capacitors in the manner shown to keep high-frequencies in the signal path between connections 2 and 3 away from the operational amplifier OP1. The reference diode is preferably of the same type as the predistorter diode D.

That part of the signal path in FIG. 1 below diode D, which has the opposite polarity to the upper diode D, is connected to an operational amplifier OP2 in a similar manner, whereby this operational amplifier OP2 must supply a negative output voltage since the output of the operational amplifier OP2 is connected to the cathode of diode D of the lower branch at a connecting point 5 via a corresponding resistance R1'. Thus, the falling voltage at switching point 10 of the reference diode has its polarity reversed in an inverter, formed in a familiar manner by an operational amplifier OP3, and is fed to the non-inverted input of the operational amplifier OP2 of the lower branch of FIG. 1 in the example.

The circuit shown for the operational amplifiers OP1 and OP2 ensures that these have a voltage amplification with the value 1, so that the same voltage (as explained with different polarities) is present at switching points 4 and 5 as is present at the corresponding reference diode Dr.

The resistance R1 in FIG. 1 decouples the respective operational amplifier from the high-frequency signal on the signal path between the connections 2 and 3. The circuit records the voltage at connecting points 4 and 5 and regulates this to the value specified by the reference diode. The resistance R1 does not affect the voltage at connecting points 4 and 5. The resistances used in the circuit arrangement shown here are extremely low-inductance and low-capacity. So-called SMD resistances (Surface-Mounted-Device) should be preferably used. The circuit can then be operated up to a frequency of around 860 MHz, for example, with no problems.

Figure 2:
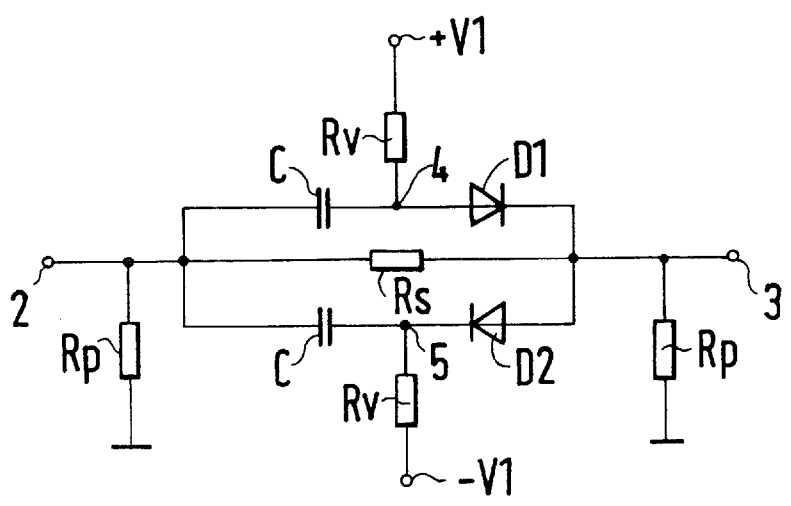

In the arrangement according to FIG. 2 only the differences to that shown in FIG. 1 will be explained. In FIG. 2 there are no operational amplifiers and no reference diode. The predistorter diodes are shown as D1 and D2 here. The connecting points 4 and 5 are directly connected via a resistance Rv of the same size as that in FIG. 1 with a positive voltage V1 and negative voltage −V1, whose value are the same as that of V1 in FIG. 1.

Figure 3:
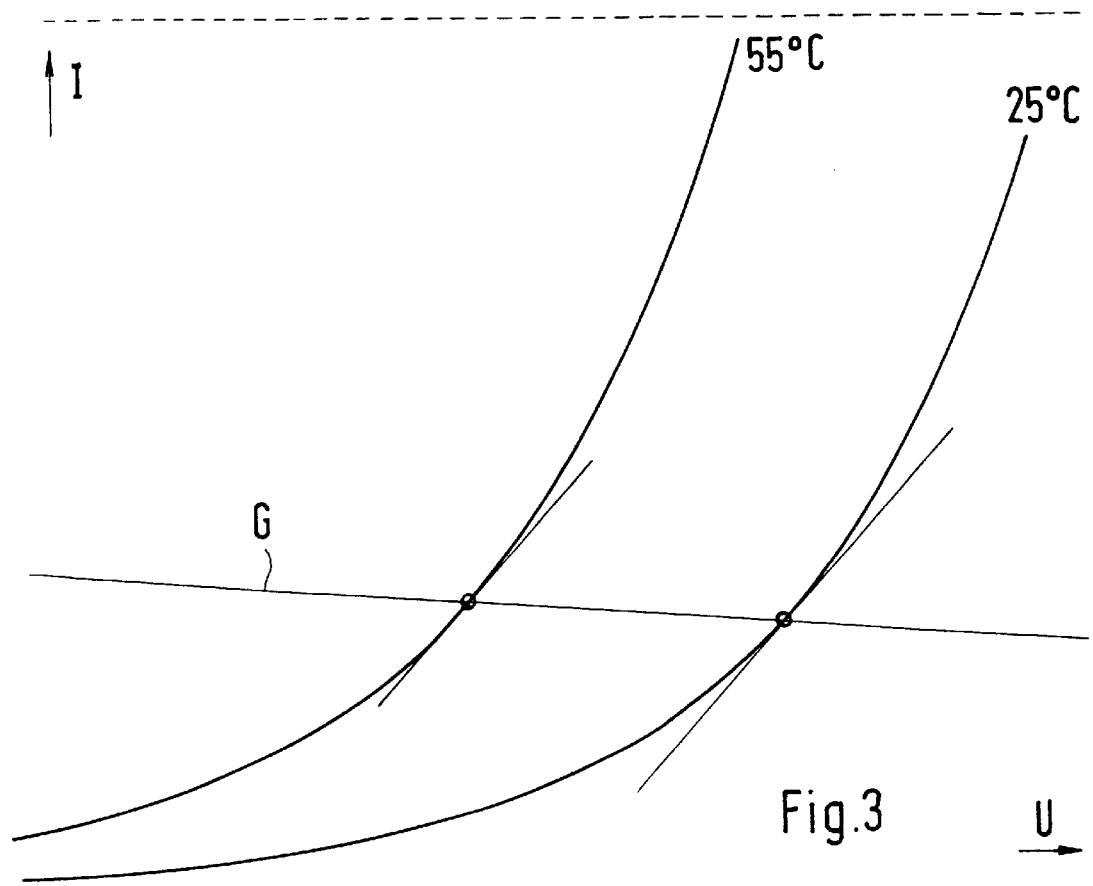

FIG. 3 is a current-voltage characteristic diagram showing the curves of the predistorter diodes for two temperatures (25° C. and 55° C.). These are also the curves of the reference diode Dr. In the arrangement according to FIG. 1 and FIG. 2 the voltage V1 and the resistances Rv define a working straight line G in this characteristic diagram. This intersects the invisible voltage axis at point U=V1 and the invisible current axis at point I=V1/Rv. V1 and Rv are dimensioned so that the working straight line G intersects the curves at points (=operating points) where the curvatures are of equal size. At temperatures in the range between the aforementioned values the operating point lies on a different curve not shown here. It is assumed that the curvatures of these curves at the respective operating points (i.e. the intersections with the working straight line G) do not differ greatly from the operating points shown.

The working straight line is fairly flat (nearly horizontal) but not horizontal. Thus, in this case the power is not fed from a current source, i.e. not with a constant current; the working straight line would otherwise run horizontal.

The curvature ($d2I/dU2$) of each curve depends on the voltage and thus on the operating point.

It is understood that the wiring in the operational amplifier can be altered as necessary to achieve an amplification other than 1. The inverting input hereby has to be connected to earth via a suitable resistance. It is also understood that instead of one single predistorter diode in each branch of a series circuit, a number of predistorter diodes can be provided as required which then have to be supplied with a correspondingly higher voltage. A number of predistorter diodes connected in series are used, for example, if the desired distortion characteristic cannot be produced with only one predistorter diode.

The reference diode Dr is thermally coupled to diodes D between connections 2 and 3 so that these elements have practically the same temperature ,thus leading to a very good compensation of the temperature-dependence of the predistorter diode D.

Figure 4:
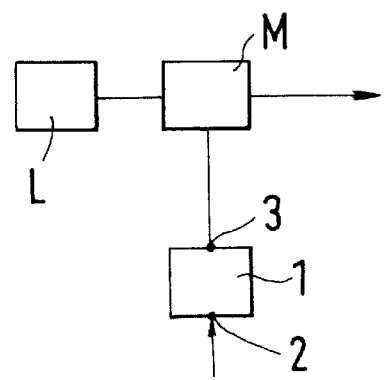

In the arrangement in accordance with FIG. 4 a light source L emits unmodulated light which is fed to the input of an external optical modulator M via a fibre optic link and which leaves the modulator M as modulated light. The modulation signal is fed to the modulation input of the modulator M via the signal path between connections 2 and 3 of the arrangement 1 according to FIG. 1 (optionally also the other arrangement shown). An amplifier can also be connected in the signal path between arrangement 1 and modulator M.

The external modulator in the example has a known phase modulator arrangement with an optical element on the basis of lithium niobate ($LiNbO3$). The output signal of this type of modulator is essentially a cosine square function of the input signal: thus, if there is a linear rise in the input signal the output signal of the modulator will have sine-shaped curve. The predistorter circuit in accordance with the invention has the job of linearizing the first half period symmetrical to the point of inflection of the sine curve. This is achieved by altering the modulation signal in the predistorter so that when it is then fed to the modulator the desired light signal is generated which has been linear modulated with respect to the non-distorted modulation signal (=high-frequency signal).

What is claimed is:

1. A circuit to reduce the temperature-dependence of a predistorter diode in a predistorter for an external optical modulator, comprising:

at least one predistorter diodes;

an ohmic resistance; and a power supply interconnected with said at least one predistorter diode and said ohmic resistance, said at least one predistorter diode connected in series with said ohmic resistance, the series circuit fed from said power supply in operation, wherein the voltage of the power supply and the ohmic resistance are selected to define at least two operating points corresponding to respective substantially different operating temperatures of said predistorter diode such that the curvature of a temperature-dependent current-voltage curve for the predistorter diode at each of said operating points is substantially the same.

2. A circuit to reduce the temperature-dependence of a predistorter diode in a predistorter for an external optical modulator, comprising:

a reference diode;

at least one predistorter diode;

an ohmic resistance; and a power supply interconnected with said at least one predistorter diode and said ohmic resistance, said reference diode thermally coupled to said at least one predistorter diode, said at least one predistorter diode connected in series with said ohmic resistances, and the series circuit fed from a power supply in operation, wherein the voltage of the power supply and the ohmic resistance arc selected to define at least two operating points corresponding to respective substantially different operating temperatures of said predistorter diode such that the curvature of a temperature-dependent current-voltage curve for the predistorter diode at each of said operating points is substantially the same, said circuit further comprising a device to apply to a terminal of each predistorter diode a voltage proportional to the voltage across the reference diode.

3. A circuit in accordance with claim 2, wherein the device includes an amplifier.

4. A circuit in accordance with claim 3, wherein the device includes a control device.

5. A circuit in accordance with claim 3 characterized in that the amplifier is a voltage amplifier whose voltage feeds an amplifier input to the reference diode.

6. A circuit in accordance with claim 5 characterized in that:
   a signal path for the signal to be distorted includes two parallel branches each with a series circuit comprising a capacitor and at least one predistorter diode whereby the predistorter diode(s) of one branch is (are) connected with opposite polarity to the predistorter diode(s) of the other branch;
   a connecting point between the capacitor and a predistorter diode in each branch is coupled to the output of an operational amplifier connected as a voltage amplifier; and
   a non-inverted input of one operational amplifier is fed with a voltage across the reference diode with a positive polarity, and a non-inverting input of the other operational amplifier is fed with a voltage across the reference diode with a negative polarity.

7. A circuit in accordance with claim 6 characterized in that the non-inverted input of one of the operational amplifiers is connected to a reference diode and the voltage across this reference diode is fed to the non-inverted input of the other operational amplifier through an inverter.

8. A predistorter of an external optical modulator with an apparatus in accordance with claim 1.

9. A predistorter diode circuit as claimed in claim 1, further comprising:
   a signal path including a resistive element;
   a pair of said series circuits having opposite polarities;
   a plurality of capacitive elements, each one of said plurality of capacitive elements connected to one of said series circuits,
   wherein said pair of series circuits are interconnected at a terminal of the predistorter diode of each said series circuit in opposite polarity and a terminal of said resistive element, the other terminal of the predistorter diode of each said series circuits is connected to a terminal of a corresponding one of said plurality of capacitative elements, and the other terminals of said corresponding ones of said plurality of capacitative elements are connected together at the other terminal of said resistive element.

10. A predistorter diode circuit as claimed in claim 2, further comprising:
   a signal path including a resistive element;
   a pair of second series circuits each including a capacitative element and at least one said predistorter diode;
   said second series circuits having opposite polarities and connected in parallel with each other and said resistive element;
   first and second voltage supply circuits having opposite polarities, connected in parallel with each other and said reference diode, said first voltage supply circuit including a first amplifier and said second voltage supply circuit including a second amplifier;
   the non-inverting input of said first amplifier supplied with the voltage across said reference diode;
   the non-inverting input of said second amplifier connected to the non-inverting input of said first amplifier through an inverter; each said first and second voltage supply circuits connected to one of said second series circuits between said capacitive element and said predistorter diode.

11. A predistorter diode circuit as claimed in claim 1, wherein said substantially different temperatures differ by approximately 30° C.

12. A circuit in accordance with claim 2, wherein said substantially different temperatures differ by approximately 30° C.

* * * * *